United States Patent Office 2,962,530
Patented Nov. 29, 1960

2,962,530

NEW BIS-SULFONYL UREAS AND PROCESS FOR THE PRODUCTION THEREOF

Ernst Habicht, Schaffhausen, Switzerland, assignor to Cilag-Chemie Limited, a Swiss company No Drawing. Filed Jan. 23, 1958, Ser. No. 710,627

Claims priority, application Switzerland Jan. 24, 1957

2 Claims. (Cl. 260—553)

This invention relates to new bis-sulfonyl ureas of the general formula $$CH_3-\text{\textlangle}\text{\textrangle}-SO_2-NH-CO-N\overset{R_1}{\underset{R_2}{\diamond}}N-CO-NH-SO_2-\text{\textlangle}\text{\textrangle}-C$$
(1) (2) (2') (1')
I in which $R_1$ represents an aliphatic radical, which may be interrupted by O, S or —S—S—, or a cycloalkylene radical, and $R_2$ represents an aliphatic radical or the two hydrogen atoms on the (2) and (2') nitrogen atoms.

The effect of the new bis-sulfonyl ureas when applied orally is a considerable and lasting lowering of the blood sugar content. As compared with the known N-sulfanilyl-N'-butyl urea, they have the advantage of a stronger and more lasting effect.

The new compounds can be prepared by reacting a compound of the formula $$Y\overset{R_1}{\underset{R_2}{\diamond}}Y$$
II with 2 mols of a compound of the formula $$CH_3-\text{\textlangle}\text{\textrangle}-SO_2-X$$
III X and Y in the two formulae representing reactive radicals capable of forming the urea bridge, and $R_1$ and $R_2$ having the meanings already defined above.

According to this process, it is for example possible so to proceed that an isocyanate of the Formula III (X=N—CO) is reacted with a diamine of Formula II (Y=NH$_2$). It is advantageous in this case to work in an inert solvent, for example in benzene or acetone, and in the presence of a proton acceptor such for example as a caustic alkali solution or a tertiary amine.

It is for example possible according to this process to react p-toluene sulfonyl isocyanate with ethylene diamine, trimethylene diamine, 1,4-diaminobutane, 1,4-diaminobutene, 2,3-diaminopentane, 1,6-diaminohexane, ω,ω'-diaminodiethyl ether, ω,ω'-diaminodiethyl disulfide, ω,ω'-diaminodiethyl sulfide, piperazine, C-alkylated piperazines, 1,4-diamino-cyclohexane, 1,3-diamino-cyclohexane, and others.

Instead of the p-tosyl isocyanate, it is also possible to use a suitably formed p-tosyl carbamic acid halide (X=NH—CO—Hal), a p-tosyl carbamic acid ester (X=NH—COOR), p-tosyl urea (X=NH—CO—NH$_2$), a p-tosyl acyl urea (X=NH—CO—NH—Ac) or p-tosyl nitrourea (X=NH—CO—NH—NO$_2$).

Conversely, a p-toluene sulfonamide of the Formula III (X=NH$_2$) can be reacted with a diisocyanate of the Formula II (Y=N—CO; $R_1$=H.H). Instead of a diisocyanate of Formula II, it is also possible to use compounds or substances which are capable of forming such a diisocyanate as an intermediate stage or which react in the same way as the diisocyanate. For example, suitably formed ureas, acyl ureas, nitroureas, bis-carbamic acid esters, bis-carboxylic acid azides or bis-carboxylic acid-N-halogen amides can be reacted with the p-toluene sulfonamide of Formula III.

It is for example also possible for a p-tosyl halide of Formula III (X=Hal) to be reacted with bis-isourea-alkyl ethers of Formula II in the presence of proton acceptors and for the bis-p-tosyl isourea ethers which are obtained to be thereafter subjected to the hydrolytic splitting reaction. Instead of the p-tosyl halides of Formula III, the corresponding sulfonyl halides can also be successfully reacted with bis-ureas of Formula II, either directly or through the intermediary of the isourea alkyl ether, and for the bis-sulfenyl ureas obtained to be oxidised to form the bis-sulfonyl ureas.

In order to produce compounds of the general Formula I, in which $R_1$ represents the radical -alkylene-S-S-alkylene-, it is also possible so to proceed that a sulfonyl urea of the formula $$CH_3-\text{\textlangle}\text{\textrangle}-SO_2-NH-CO-NH-Alkyl-SH$$
IV is prepared by one of the methods set out above and is then converted into the disulfide urea by treatment with a suitable oxidising agent. Suitable oxidising agents are for example ferric chloride or iodine in alkali solution.

For the production of ureas of Formula I, in which $R_1$ represents the radical —CH$_2$—CH$_2$—S-alkyl-, an N-tosyl-N'-thiol-alkyl urea of Formula IV can also be reacted with the N-tosyl carbaminyl aziridine, which is readily obtainable from N-tosyl isocyanate and ethyleneimine, in the presence or absence of an inert solvent or diluent and preferably with gentle heating.

The following examples further illustrate the invention:

Example 1

52 g. of 2,2'-diaminodiethyl ether are dissolved in 1000 cc. of dioxane and 200 g. of p-tosyl isocyanate in 500 cc. of dioxane are added dropwise to the solution. After the reaction subsides, the mixture is heated for another hour on a water bath. The dioxane is thereafter distilled off and the residue taken up in 2N-sodium bicarbonate solution. The solution is filtered off from a small quantity of undissolved substance and the filtrate is acidified with acetic acid. The bis-2,2'-(p-tosyl carbaminoyl)-diethyl ether of the formula $$\left(CH_3-\text{\textlangle}\text{\textrangle}-SO_2-NH-CO-NH-CH_2-CH_2\right)_2-O$$

is thus obtained as an amorphous powder which has a softening point in the region of 100° C. The new urea dissolves readily in chloroform, ethanol and acetone and less readily in ether and petroleum ether.

Example 2

50 g. of 1,3-diaminopropane in 500 cc. of benzene are mixed in portions with 276 g. of p-tolyl sulfonyl isocyanate in 1500 cc. of benzene. After standing for some hours, the mixture is heated for a short time to boiling point, then diluted with petroleum ether and the precipitated crystals are filtered off with suction. After recrystallisation from dilute methanol, the urea of the formula

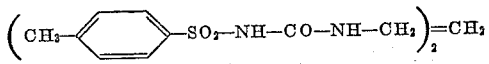

is obtained as colorless crystals which melt at 196–197° C. This urea is readily soluble in sodium bicarbonate solution and methanol, but less readily soluble in chloroform and toluene.

*Example 3*

In the same manner as described in Example 2, the urea of the formula

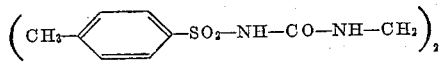

melting at 202–203° C. is obtained from 35 g. of 1,2-ethylene diamine and 276 g. of p-tosyl isocyanate.

*Example 4*

10 g. of cystamine are dissolved in 50 cc. of dioxane. A solution of 27.6 g. of p-tosyl isocyanate in 200 cc. of dioxane is added to the first-mentioned solution. The combined solution is heated for a short time to 80° C. after the reaction subsides and 600 cc. of water are then added. After standing for a relatively long time, a colorless mass crystallises out, which is filtered off with suction and recrystallised from dioxane/water. The urea of the formula

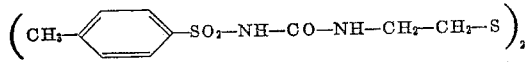

which forms crystals melting at 193–194° C. is obtained. It is only sparingly soluble in most organic solvents, even at elevated temperatures.

*Example 5*

In a manner analogous to that of Example 1, 2 mols of p-tosyl isocyanate can be reacted with 1 mol of piperazine in dioxane. The urea formed has the formula

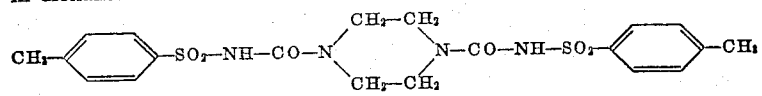

It dissolves well in aqueous sodium bicarbonate solution and melts at 260–263° C.

*Example 6*

By reacting p-tosyl isocyanate with 1,4-diamino butane in benzene in the presence of triethylamine, the corresponding bis-sulfonyl urea of the formula

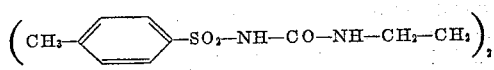

is obtained which melts at 160–163° C.

*Example 7*

By reacting 2 mols of p-tosyl isocyanate with 1 mol of 1,6-diaminohexane in dioxane, the highly active bis-urea of the formula

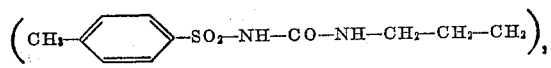

is obtained. It is insoluble in water, ether and petroleum ether, sparingly soluble in ethanol and readily soluble in acetone. It melts at 186° C.

*Example 8*

The bis-urea produced in Example 7 can also be obtained from 2 mols of p-toluene sulfonamide and 1 mol of 1,6-hexamethylene diisocyanate in acetone and in the presence of caustic soda solution. It can also be obtained if p-toluene sulfonyl urea is heated with 1,6-diaminohexane in the mol ratio of 2:1.5 in glacial acetic acid.

*Example 9*

By reacting 1 mol of 1,4-diaminocyclohexane with 2 mols of p-tosyl isocyanate in dioxane, the urea of the formula

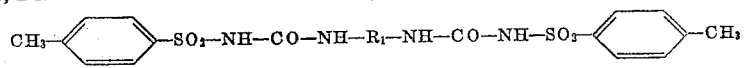

is obtained. This crystallises out from dilute methanol as colorless crystals melting indefinitely at 180–190° C. It is fairly soluble in methanol and acetone, but only sparingly soluble in water and ether.

What I claim is:
1. The new bis-sulfonyl urea of the formula

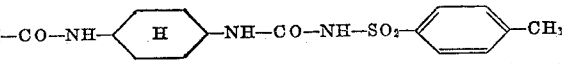

2. New bis-sulfonyl ureas of the formula

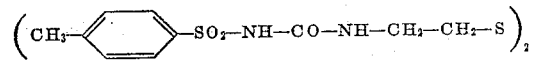

wherein $R_1$ is a lower alkylene group which is interrupted by the —S—S— bridge.

References Cited in the file of this patent
UNITED STATES PATENTS

| | | |
|---|---|---|
| 2,398,283 | Boon | Apr. 9, 1946 |
| 2,409,829 | Boon | Oct. 22, 1946 |

FOREIGN PATENTS

| | | |
|---|---|---|
| 99,465 | France | July 25, 1951 |
| F. 18,136 | Germany | Sept. 27, 1956 |

OTHER REFERENCES

Petersen: Chem. Berichte, vol. 83, page 554 (1950).
Kurzer: Chem. Rev., vol. 50, pages 5, 18, 19, 27 (1952).